United States Patent
Heindl

(10) Patent No.: US 8,556,543 B2
(45) Date of Patent: Oct. 15, 2013

(54) SHEET PILE COMPONENTS AND PROCESS FOR MAKING THE SAME

(75) Inventor: Richard Heindl, Munich (DE)

(73) Assignee: Pilepro, LLC, Austin, TX (US)

( * ) Notice: Subject to any disclaimer, the term of this patent is extended or adjusted under 35 U.S.C. 154(b) by 122 days.

(21) Appl. No.: 12/450,566

(22) PCT Filed: Mar. 31, 2008

(86) PCT No.: PCT/EP2008/002531
§ 371 (c)(1),
(2), (4) Date: Sep. 30, 2009

(87) PCT Pub. No.: WO2008/119529
PCT Pub. Date: Oct. 9, 2008

(65) Prior Publication Data
US 2010/0054868 A1   Mar. 4, 2010

(30) Foreign Application Priority Data
Mar. 30, 2007   (DE) .......................... 10 2007 015 455

(51) Int. Cl.
*E02D 5/02*   (2006.01)

(52) U.S. Cl.
USPC .......................................... 405/278; 405/274

(58) Field of Classification Search
USPC ................... 405/274, 278, 279, 281
See application file for complete search history.

(56) References Cited

U.S. PATENT DOCUMENTS

| | | | |
|---|---|---|---|
| 6,443,664 B1 * | 9/2002 | Horan et al. | 405/279 |
| 2002/0007609 A1 * | 1/2002 | Pervan | 52/590.2 |
| 2007/0077129 A1 * | 4/2007 | Hermes et al. | 405/278 |
| 2010/0151269 A1 | 6/2010 | Hermes | |

FOREIGN PATENT DOCUMENTS

| | | |
|---|---|---|
| DE | 613210 C1 | 2/1936 |
| DE | 624960 C1 | 2/1936 |
| DE | 29821624 U1 | 8/1999 |
| DE | 19851877 | 5/2000 |
| DE | 102006002241 | 8/2007 |
| EP | 0795649 B1 | 9/1996 |
| JP | 2001146738 | 5/2001 |
| WO | WO 2007/082619 * | 7/2007 |

* cited by examiner

*Primary Examiner* — Sean Andrish
(74) *Attorney, Agent, or Firm* — Merchant & Gould P.C.

(57) ABSTRACT

The invention relates to a method for manufacturing a sheet pile wall component such as a sheet pile, a connection profile or a carrier that exhibits at least one interlock with a uniform cross-section extending across the entire length of the sheet pile wall component for engaging the interlock of an additional sheet pile wall component. According to the invention, a preliminary product is produced by forming using this method, and the interlock when viewed in its cross-section is manufactured at least in sections by shape-cutting at the section of the preliminary product that is to be provided with the interlock, whereby the cross-section of the section is dimensioned sufficiently such that the dimensional deviations caused by forming at the preliminary product are taken into account for the shape-cutting of the interlock.

15 Claims, 2 Drawing Sheets

SHEET PILE COMPONENTS AND PROCESS FOR MAKING THE SAME

The invention relates to a method for manufacturing a sheet pile wall component such as a sheet pile, a connection profile or a carrier which exhibits at least one interlock with a uniform cross-section extending across the entire length of the sheet pile wall component for engaging the interlock of an additional sheet pile wall component. In addition, the invention relates to a sheet pile wall component of the type produced by this method.

Sheet piles are comprised of various sheet pile wall components, for example, sheet piles, that are rammed into the ground. To ensure a secure hold between the sheet pile wall components, these components are provided with so-called interlocks at their longitudinal edges that typically run vertically. In this context, the term locks refers to profiled sections that are designed integrally with the sheet pile wall component. The locks extend across the entire length of the sheet pile wall component and have a uniform cross-sectional shape. The best known interlock shapes are listed in DIN EN 10248-2. They include, for example, Larssen interlocks, Hoesch interlocks, the so-called Ball and Socket interlocks or flat profile interlocks formed from a thumb and finger, to name just a few of the best known interlock types.

The best known sheet pile wall components that are provided with such interlocks are the so-called sheet piles that are combined to create sheet pile walls in the described manner. To erect so-called combination sheet pile walls, carriers, for example I-beams, are used in addition to said sheet piles and are rammed into the ground at certain distances to each other with at least one sheet pile being driven into the ground between them. To couple the sheet piles with the carriers, additionally so-called connection profiles are used. The connection profiles are provided with respective interlocks for engaging the sheet piles and with attachment profiles that are used to attach the connection profiles to the carriers.

Sheet piles, carriers and said connection profiles are usually manufactured by hot rolling, cold rolling or for more complex interlock shapes by extrusion molding.

This has the disadvantage that the change-over of the rolling train or of the extrusion equipment requires significant time and technical effort if a different interlock shape is to be manufactured. In addition, there is no possibility to rework interlocks, for example at a construction site, or to provide interlocks later for conventional steel components such as I-beams without welding.

SUMMARY OF THE INVENTION

Based on this prior art, it is the objective of the invention to provide an improved method for manufacturing a sheet pile wall component or to provide an improved sheet pile wall component through which, when employed, or through which the interlocks can be manufactured in particular with great flexibility.

This objective is achieved by producing a preliminary product through forming and then shape-cutting the interlock, when viewed in its cross-section, the section of the preliminary product that is to be provided with the interlock, whereby the cross-section of the section is dimensioned sufficiently such that the dimensional deviations caused by forming at the preliminary product are taken into account for the shape-cutting of the interlock.

Using the method according to the invention combines the advantages of two manufacturing methods, namely forming, i.e., hot rolling, cold rolling or extrusion molding and shape-cutting, i.e., methods such as milling or grinding. Until now, due to the high production numbers, sheet pile wall components made of steel, such as sheet piles, connection profiles and carriers are manufactured by forming, where in one run, the various interlock configurations are formed at the same time, at the sheet pile wall components. Because it is relatively difficult to form steel and even with hot rolling the steel has a limited formability, only a limited number of comparatively simple interlock shapes can be manufactured using the forming method. Although extrusion molding allows for the manufacture of more complex cross-sectional shapes, its disadvantages are the significant effort required to make the dies required for extrusion molding and the comparatively expensive use costs.

The inventive combination of forming technology and shape-cutting combines the simple and cost-effective manufacturability of sheet pile wall components made of steel using forming methods, such as hot or cold rolling, with the high flexibility of shape-cutting, which enable in particular the manufacture of smaller numbers or of interlock shapes that require particularly complex or precise manufacturing. According to the invention, it only needs to be ensured that the section in which the interlock is to be formed by shape-cutting is, after forming, dimensioned sufficiently for forming the interlock appropriately. For example, sheet pile wall components manufactured by forming when viewed across their length exhibit high dimensional deviations that may be in a range of several millimeters, potentially even centimeters. By providing appropriate material in the sections where the locks are to be formed, the dimensional deviations occurring during forming no longer play a major role during shape-cutting. In addition, interlocks manufactured by shape-cutting are characterized by high precision.

It shall be noted in this regard that the interlocks need not be manufactured entirely by shape-cutting. It is also within the scope of the invention if only one or several sections of the interlock, when viewed across the cross-section of the interlock perpendicular to its longitudinal direction, are shape-cut.

Additional advantages of the invention become apparent from the following description, the drawing as well as the subordinate claims.

So for example, using a variation of a particularly preferred method of the method according to the invention it is recommended to mold during the forming of the preliminary product an accumulation of material at the section that is to be provided with the interlock and to manufacture the interlock through shape-cutting from this material accumulation. Molding the material accumulation on ensures that sufficient material is provided at the section where at a later time the interlock shall be produced. It is furthermore possible to mold certain elements of the interlock that are easily produced by forming at the material accumulation such as hook-shaped sections, thumb strips and the like. It is of particular advantage if the material accumulation is molded during the production of the preliminary product such that the material accumulation is adapted to the shape of the interlock when viewed cross-sectionally.

It is furthermore recommended to start the manufacture of the sheet pile wall component by a first molding of the preliminary product. Next form certain sections of the interlock by shape-cutting. Then form certain design features at the interlock in an additional step through additional forming, for example cold or hot rolling in order to create the final shape of the interlock in the cross-sectional view. In this manner it is possible, for example, to create interlock chambers formed in the interlock by shape-cutting and then to partially close the yet open interlock chamber through a subsequent molding of a hook strip such that only the interlock jaw that is needed for engaging remains.

To form more complex interlock sections after shape-cutting and not expose the material in the area of the interlock to high forming work, it is furthermore recommended to heat the area of the section or the material accumulation that is still to be formed to the hot forming temperature and only then mold it to form the final interlock shape. The occurrence of microcrystalline cracks can be prevented by setting the forming temperature appropriately.

Shape-cutting is preferably done with several cutting tools that are employed in one single processing step. However, it is also conceivable to carry out the shape-cutting in several successive processing steps. The latter may be advantageous if a comparatively large amount of material needs to be removed during shape-cutting and several steps with different tools are required.

Preferably a tool with a geometrically defined cutting edge, for example a milling cutter, is used as the shape-cutting tool. By using a respective adjustable multi-axis milling device, the milling tool can be brought into contact with the sheet pile wall component for chip removal at various positions relative to said sheet pile wall component. Alternatively or supplementary it is furthermore advantageous if a form cutter is used, i.e., a milling tool with an outer contour that already corresponds to the cross-sectional shape to be milled. As an alternative if a small amount of material needs to be removed or when fine-milling, a tool with an undefined cutting edge may be used, for example grinding discs, which when used as form grinding discs may also be provided with a defined circumferential contour, in order to form the interlock through form grinding.

If the interlock is produced during the manufacture of the sheet pile wall component, then the preliminary product with its section or its material accumulation where the interlock is to be formed is guided past a stationary processing station for shape-cutting. For this purpose, the processing station may be arranged directly after the rolling stand of a cold rolling train or after a cooling train arranged downstream of the hot rolling train.

It is also conceivable to produce the interlock using a mobile processing station. This is particularly advantageous if a simple interlock, for example a trapezoidal interlock similar to that of a wedge-shaped carrier, shall be formed at a later time on a conventional carrier such as an I-beam, for example at a construction site.

According to a second aspect of the invention, a sheet pile wall component, such as a sheet pile, a connection profile or a carrier, that exhibits at least one interlock with a uniform cross-section extending across the entire length of the sheet pile wall component for engaging the interlock of an additional sheet pile wall component. This sheet pile wall component is produced according to the inventive method and is characterized in that the sheet pile wall component, has been manufactured by forming and that at least one interlock has been made at least in sections through shape-cutting.

Preferably, a material accumulation is formed at that section of the sheet pile wall component that is provided with the interlock such that the interlock can be realized in said material accumulation through shape-cutting.

Preferably, the interlock has been formed into its final interlock shape through shape-cutting and subsequent forming. This has the advantage that the interlock can be produced with high precision while also allowing interlock shapes to be realized that cannot be produced by shape-cutting alone.

According to the invention, sheet pile wall components are possible that have different interlock shapes, for example sheet pile wall components with a Larssen interlock, a Hoesch claw, a Hoesch button, a ball interlock, a socket interlock, a flat profile interlock, a trapezoidal groove, a trapezoidal interlock, a trapezoidal flange or a dovetail groove. Preferably, the sheet pile wall component is a wedge-shaped carrier with a cross-sectional shape that extends in the shape of a wedge towards the free end of the T-beam.

For a full understanding of the present invention, reference should now be made to the following detailed description of the preferred embodiments of the invention as illustrated in the accompanying drawings.

DESCRIPTION OF THE PREFERRED EMBODIMENTS

Figure 1A:
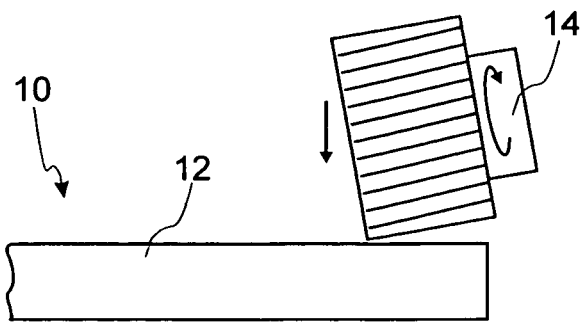
FIGS. 1a and b are schematic presentations of the manufacture of a wedge-shaped recess at a conventional T-carrier, whereby the T-carrier is shown in front view.

The preferred embodiments of the present invention will now be described with reference to FIGS. 1a-3d of the drawings. Identical elements in the various figures are designated with the same reference numerals.

Figure 1B:
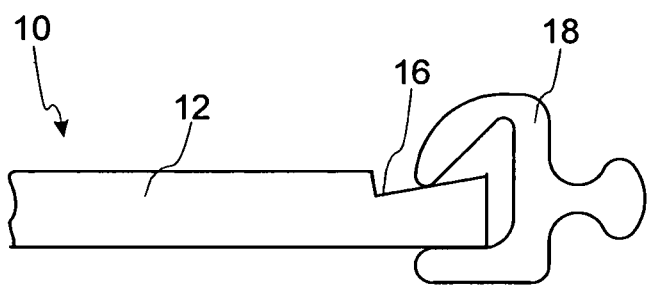

FIGS. 1a and 1b show the manufacture of a wedge-shaped recess at a conventional T-carrier 10. The T-carrier 10 exhibits a T-beam 12 with a specified material strength of, for example, 14 mm. Using a milling cutter 14 that is arranged in a slanted manner at about 10°, a pocket 16 extending in a slanted manner is machined out along the entire length of the T-carrier 10 in the direction of the T-downstroke (not shown). After milling, the T-carrier 10 exhibits the cross-sectional shape shown in FIG. 1b and is now suitable for the attachment of a connection profile 18 as shown in FIG. 1b, thus fulfilling the purpose of a so-called wedge-shaped carrier.

The milling can be done when manufacturing the T-carrier 10. Alternatively, milling may also be done, if necessary, on site at the construction site.

Figure 2A:
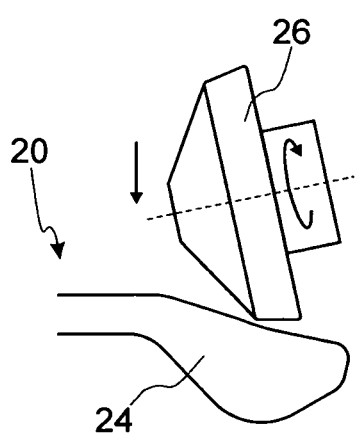
FIGS. 2a and b are schematic presentations of the manufacture of a Hoesch claw at a sheet pile, whereby the sheet pile is shown in front view.
Figure 2B:
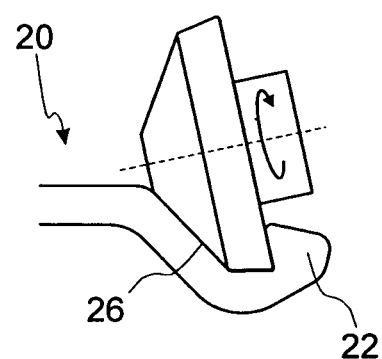

FIGS. 2a and 2b show the manufacture of a sheet pile wall 20 with a so-called Hoesch claw 22. The sheet pile wall 20, the face of which is shown in FIGS. 2a and 2b, is initially prefabricated in a known manner by heat rolling, whereby a material accumulation 24 is formed at the longitudinal edge of the created preliminary product in place of a finished interlock, while the remaining section is free of material accumulation. In the cross-sectional view, the material accumulation 24 already exhibits the basic shape of the Hoesch claw 22.

After a cooling down of the sheet pile 20, the sheet pile 20 is guided past a milling device that uses a form cutter 26 to machine out a groove 28 that extends across the entire length of the sheet pile 20. The outer contour of the form cutter 26 is selected such that the finished milled groove 28 of the recess corresponds to the finished Hoesch claw 22.

FIGS. 3a to 3d show the manufacture of a sheet pile 30 with a Larssen interlock 32. Here too, a preliminary product is initially manufactured by hot-rolling, where a material accumulation 34 is molded at the longitudinal edge in place of the finished interlock, while the remaining section is free of material accumulation. The material accumulation 34 exhibits a first section 36 forming the free end of the longitudinal edge as well as second section 38 that points about a right angle from said first section 36 in FIG. 3a.

Figure 3A:
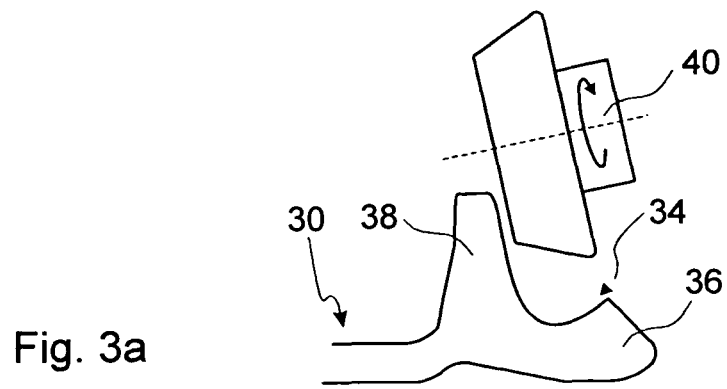
FIGS. 3a to d are schematic presentations of the manufacture of a Larssen hook at a sheet pile, where additional forming occurs after shape-cutting.
Figure 3B:
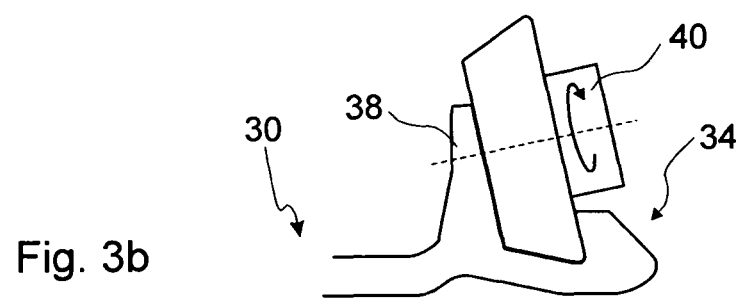
Figure 3C:
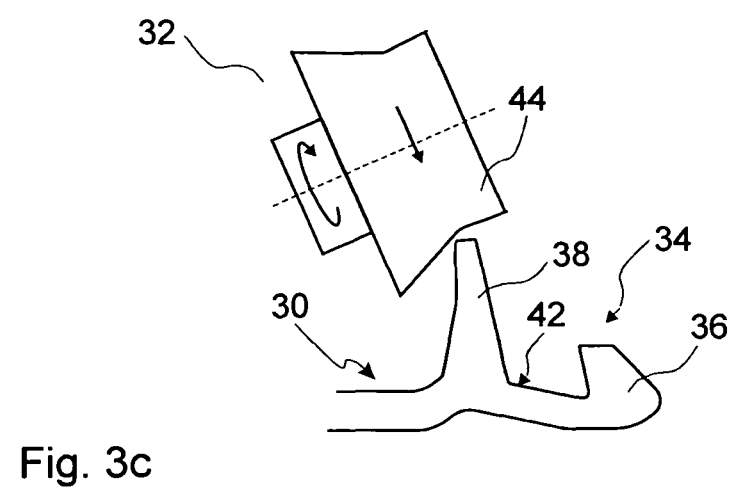
Figure 3D:
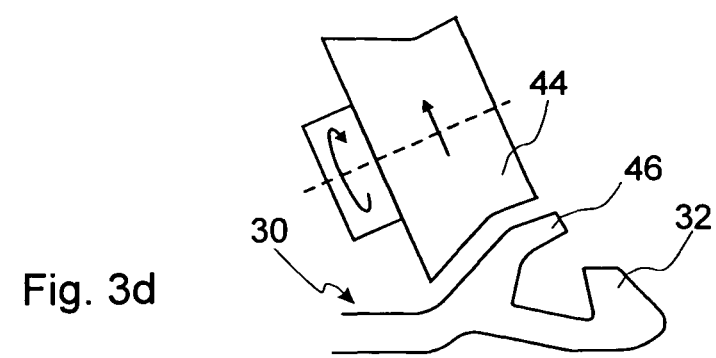

Thereafter, a groove 42, stretching across the entire length of the sheet pile 30 and arranged at the first section 36 of the area shown in FIG. 3a top is milled out using a form cutter 40. At the same time, a slight amount of material is also removed from the side area of the second section 38 that points outward. Here too, the outer contour of the form cutter 40 is selected such that the finished milled groove 42 corresponds approximately to the cross-section of the later interlock chamber of the Larssen interlock 32.

After machining out the groove 42, the upward-pointing second section 38 is heated to a forming temperature that is typical for hot rolling using a heating device like for example an induction heating device (not shown). Thereafter, the second section 38 is partially turned over in the direction of the first section 36 using a forming roller 44 by forming a hook strip 46 of the Larssen interlock 32. The outer contour of the forming roller 44 is also formed such that the turned over second section 38 exhibits a specified form that corresponds to the hook strip 46 of a conventionally produced Larssen interlock 32.

The method according to the invention allows for a simple and elegant manner of manufacturing very different interlock shapes, whereby such interlocks may, for example, also be formed at conventional I-beams as long as sufficient material is provided at the T-beams of the I-beam.

There has thus been shown and described a novel sheet pile component and method of manufacturing the same which fulfills all the objects and advantages sought therefor.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method for manufacturing a sheet pile wall component having a longitudinal edge and at least one interlock at the longitudinal edge; the at least one interlock being a profiled section that is integral with a remaining section of the sheet pile wall component, the at least one interlock having a uniform cross-section extending across an entire length of the sheet pile wall component, for engaging an interlock of an additional sheet pile wall component, said method comprising the steps of:

producing a preliminary product through forming, wherein a material accumulation is formed during the forming of the preliminary product at a section that is to be provided with the at least one interlock while the remaining section is free of material accumulation; and shape-cutting the at least one interlock at a section of the preliminary product that is to be provided with the at least one interlock, wherein the cross-section of said material accumulation is dimensioned sufficiently upon forming such that dimensional deviations caused by the forming of the preliminary product are taken into account for the shape-cutting of the at least one interlock.

2. The method as set forth in claim 1, wherein the material accumulation is molded during the forming of the preliminary product such that the material accumulation has a basic shape of the at least one interlock to be produced when viewed cross-sectionally.

3. The method as set forth in claim 2, further comprising, after the step of shape-cutting, forming the section of the preliminary product that is to be provided with the at least one interlock to a final interlock shape.

4. The method as set forth in claim 3, wherein the step of forming the section after shape-cutting to form the final interlock shape includes heating to a heat forming temperature.

5. The method as set forth in claim 1, wherein the shape-cutting of the at least one interlock is carried out through several chip-removing tools, in several successive processing steps.

6. The method as set forth in claim 1, wherein the shape-cutting is performed using at least one cutting tool with a geometrically defined cutting edge.

7. The method as set forth in claim 1, wherein said section of the preliminary product is guided past a stationary processing station for shape-cutting.

8. The method as set forth in claim 1, wherein the at least one interlock is created using a mobile processing station.

9. The method as set forth in claim 1, wherein the shape-cutting is carried out through at least one of form-milling and form-grinding.

10. The method as set forth in claim 1, wherein the shape-cutting is carried out immediately following the forming of the preliminary product.

11. The method as set forth in claim 1, wherein said at least one interlock is introduced in said material accumulation through shape-cutting.

12. The method as set forth in claim 11, wherein the at least one interlock is formed into a final interlock shape after shape-cutting through subsequent forming.

13. The method as set forth in claim 12, wherein the formed final interlock is selected from the group consisting of a Larssen interlock, a Hoesch claw, a Hoesch button, a ball interlock, a socket interlock, a flat profile interlock, a trapezoidal groove, a trapezoidal interlock, a trapezoidal flange and a dovetail groove.

14. The method as set forth in claim 1, wherein the sheet pile wall component is a wedge-shaped carrier.

15. The method as set forth in claim 1, wherein shape-cutting is performed using at least one cutting tool in the form of a grinding disk.

\* \* \* \* \*